United States Patent [19]

Suomalainen

[11] Patent Number: 4,970,451
[45] Date of Patent: Nov. 13, 1990

[54] DEVICE FOR UTILIZING LOW VOLTAGE ELECTRIC CURRENT SOURCES

[75] Inventor: Eero Suomalainen, Helsinki, Finland

[73] Assignee: Insinooritoimisto Pentti Tamminen Ky, Helsinki, Finland

[21] Appl. No.: 336,752

[22] Filed: Apr. 12, 1989

[30] Foreign Application Priority Data

Apr. 12, 1988 [FI] Finland .................................. 881690

[51] Int. Cl.⁵ .............................................. G05F 1/613
[52] U.S. Cl. ..................................... 323/222; 323/272; 323/282
[58] Field of Search ............... 323/222, 268, 271, 272, 323/280, 901; 363/65

[56] References Cited

U.S. PATENT DOCUMENTS

| | | | |
|---|---|---|---|
| 4,085,358 | 4/1978 | Holcomb | 320/9 |
| 4,121,115 | 10/1978 | de Mere | 307/150 |
| 4,156,273 | 5/1979 | Sato | 323/901 |
| 4,825,144 | 4/1989 | Alberkrack et al. | 323/272 |

FOREIGN PATENT DOCUMENTS

3610035A1 9/1987 Fed. Rep. of Germany .
2485288 12/1981 France ........................... 323/222
8000572-1 1/1979 Sweden .

OTHER PUBLICATIONS

Gerald Grady, Maxim Integrated Products, Sunnyvale, Calif., Design Ideas, "Step-Up Converter Produces 5V from 1.5V", EDN, Nov. 12, 1987, p. 146.

Maxim data sheet, MAX644/645 Highlights, p. 71.

Primary Examiner—Peter S. Wong
Attorney, Agent, or Firm—Wolf, Greenfield & Sacks

[57] ABSTRACT

A DC to DC step-up converter is provided which employs high efficiency switching components such as MOSFET switching components in a main converter and provides a low power auxiliary converter to obtain the start up voltage required for operating the low resistance component of the main converter. A control circuit is provided which utilizes either the start up voltage from the auxiliary converter or a feedback voltage from the main converter output to provide control input to the low resistance switching devices which inputs are operative to maintain the output voltage at a desired level.

11 Claims, 4 Drawing Sheets

DEVICE FOR UTILIZING LOW VOLTAGE ELECTRIC CURRENT SOURCES

FIELD OF THE INVENTION

This invention relates to a device which produces at high efficiency an adjustable constant voltage higher than that of the primary source.

BACKGROUND OF THE INVENTION

The voltage of a single galvanic cell varies between about 0.5 and 3.0 volts depending on active materials and remaining capacity. To achieve higher voltages two or more cells must be connected in series.

A very usual problem in battery systems comprising several cells in series is that when one single cell is weaker than other cells, at the end of the discharge it may reverse its polarity and become permanently damaged. The whole power source is weakened and its theoretical energy is thus only partially utilized. This problem is well known with nickel-cadmium batteries. NiCd batteries can be charged and discharged up to 1000 times as single cells. Depending on the discharge current and the number of cells in series, the cycle life of a deep-discharged NiCd battery can be less than twenty. Also the voltage of most batteries varies depending on the state of charge and discharge current which sometimes is a problem.

Connecting many cells in series is not economical and results in lower energy density when compared to filling the available space with a few cells or preferably with just one large cell. The room for batteries in an electrical device is determined by the required voltage and the size and shape of available batteries. A typical shape is cylindrical, which means that in multicell batteries much of the available space cannot be utilized.

Some electrical devices have been developed to solve the problems discussed above. Common to all of them is to electrically raise the voltage of one cell or a few cells to a higher level.

U.S. Pat. No. 4,121,115 presents a power source having a battery as a primary source and a step up type voltage converter which keeps the output voltage constant. U.S. Pat. No. 4,085,358 shows converters which produce about 8 volts from input voltages of 2.0 to 3.3 volts. Both circuits utilize bipolar transistors which work properly, even at low voltages, but the voltage drop across these transistors causes the efficiency of the circuits to be comparatively low.

Swedish Patent No. SE B 444626 discloses a combination of a lithium cell and a transformer based device which raises the voltage to between 6 and 500 volts. Because of the transformers, the output voltage is proportional to the input voltage and voltage adjusting can be made only by changing the number of wire turns in the transformer. Bipolar transistors in this device also cause energy losses such that high efficiency cannot be achieved. In addition, a transformer type device is comparatively heavier and bigger than other types of DC-DC converters.

German Patent No. DE A1 3610035 describes a device utilizing a MOSFET transistor, which makes it efficient even at low primary voltages. A disadvantage is that, because of this transistor, the device must have at least 4 volts as a start voltage.

SUMMARY OF THE INVENTION

In accordance with the above, this invention provides a DC-DC step up voltage converter which is capable of providing both high output power and high operating efficiency while requiring a low operating voltage and a low start voltage. This is made possible by combining two voltage converters that use a common electric current source. The first converter is a bipolar transistor based, very low power converter which functions only to produce an operating voltage to the second, high power converter. The latter converter uses low-resistance elements such as MOSFET transistors as switching components. The former converter is necessary because it makes it possible to utilize the device with low voltage batteries or other electric current sources. The latter converter is essential for achieving high power and good efficiency. In the following these converters are called "auxiliary converter" and "main converter", respectively.

According to the invention both converters are of the step up type. In the main converter, the resistances along the current path are minimized by using a ferrite core inductor with small resistive and inductive losses, and MOSFET switching components, which have a small resistance. This resistance can be further reduced by connecting two or more MOSFET transistors in parallel. The auxiliary converter utilizes bipolar transistors, which make it possible to start the device at 0.7 volts. The auxiliary converter produces about 10 V to the MOSFET control circuit, which is necessary for effective function. If the output voltage is higher than the auxiliary voltage, the output voltage, which is fed back, is used to control the control circuit and the auxiliary converter is only needed for starting the device.

Theoretically there is no lower limit to the voltage that the device, once started, is able to utilize. A preferred upper limit for good efficiency is about 30 times the input voltage. For example, if the output voltage is selected to be 15 V or lower, practically all of the theoretical energy of any commercial battery cell can be utilized. In order to produce very high voltages, two main converters, with a common auxiliary converter, can be connected in series.

IN THE DRAWINGS

The invention will be explained in more detail in the following, with reference to the drawings in which.

DETAILED DESCRIPTION

Figure 1:
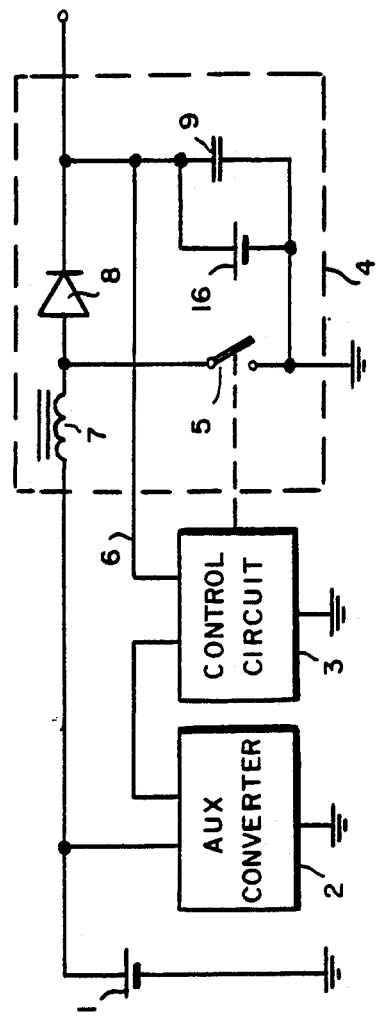
FIG. 1 is a schematic circuit diagram of the device.

FIG. 1 shows schematically the basic device of the invention. From a battery cell 1, auxiliary converter 2 provides the operating voltage to control circuit 3, which regulates the switching component 5 of the main converter 4. When the switch 5 is on or closed, energy from the battery 1 charges inductor 7, and when the switch 5 is off or open, this energy is discharged through a diode 8 to charge output capacitor 9. Control circuit 3 regulates the on/off ratio of the switch 5 by means of feedback line 6 from the output voltage, so that the output voltage remains constant, independent of variations in voltage from the battery 1.

Figure 2:
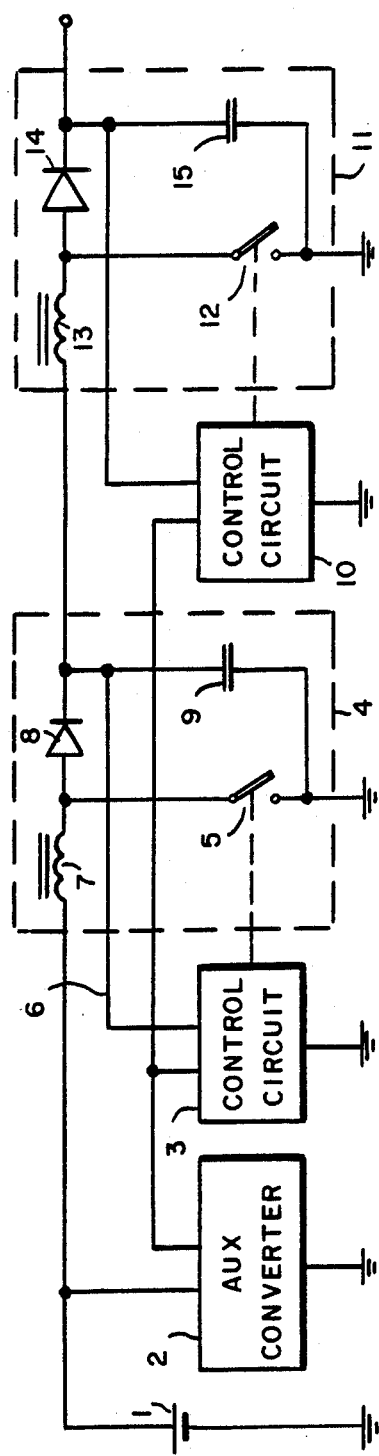
FIG. 2 is a schematic circuit diagram of the device with two main converters connected in series.

FIG. 2 is a schematic circuit diagram showing how another control circuit 10 and main converter 11 are added to the device according to FIG. 1. The parts numbered 12, 13, 14 and 15 are similar to the parts 5, 7, 8 and 9, respectively. Operating voltage for both control circuits 3 and 10 is taken from the auxiliary converter 2 or from the output of either main converter, the feedback signal to the control circuits being taken from main converter 11 in FIG. 2. If a storage battery 16 comprising one or more cells is connected in parallel with the capacitor 9, as shown in FIG. 1, or replacing it, the device can, for short periods, produce high, stable outputs in spite of loss of or deficiencies in the primary power source which may have a low or variable voltage and relatively high internal resistance. This way, energy sources such as wind generators, air depolarized galvanic cells, solar cells, thermoelectric couples, etc. can be utilized as the primary power source 1.

Figure 3:
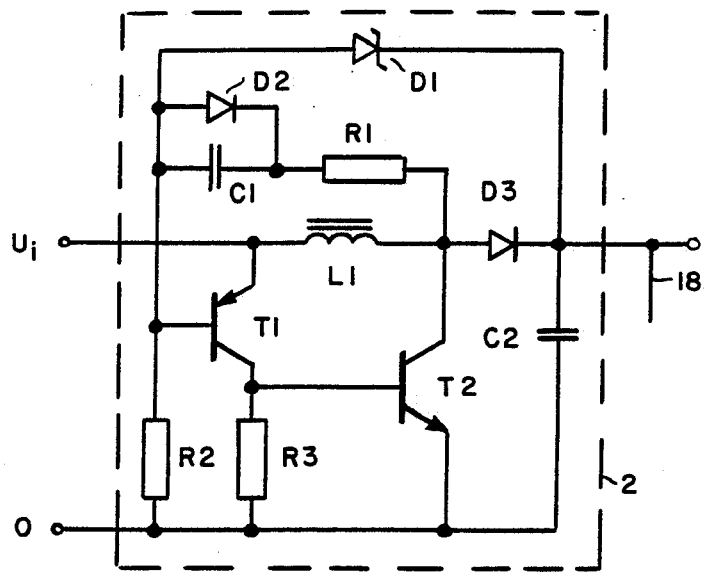
FIG. 3 is a circuit diagram of an auxiliary converter.

FIG. 3 shows a circuit which may be used for the auxiliary converter 2. When the input voltage $V_i$ from battery cell 1 at terminal $U_i$ exceeds a predetermined value, for example, 0.7 volts, transistor T1 closes (i.e., becomes conducting), causing transistor T2 to also close. Current from the primary power source at terminal $U_i$ then flows through inductor L1 and transistor T2 until transistor T2 saturates. The collector voltage of transistor T2 increases, which causes the base voltage of transistor T1 to increase through a feedback path comprising resistor R1, capacitor C1 and diode D2. This causes transistor T1 to become non conducting, which in turn opens transistor T2. The current from L1 starts to flow through diode D3 and charges capacitor C2 causing its voltage to rise. When the energy of L1 is discharged into capacitor C2, the collector voltage of transistor T2 decreases as well as the base voltage of transistor T1 which causes these transistors to again close. This procedure is repeated until the voltage of capacitor C2 is high enough for zener diode D1 to become conductive. The base voltage of transistor T1 then rises opening transistors T1 and T2. Operation of the converter is thus inhibited until the voltage of capacitor C2 decreases slightly. By choosing diode D1 and resistor R2 properly, the output voltage may be limited to about 10 volts which is high enough for starting and supporting the main converter.

Figure 4:
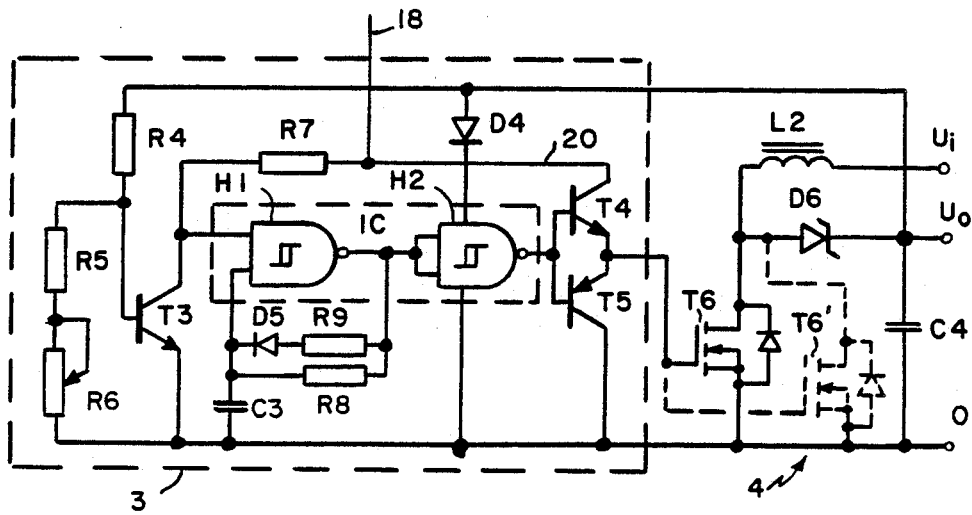
FIG. 4 is a circuit diagram of a control circuit and a main converter.

FIG. 4 shows circuits suitable for use as the control circuit (3, 10) and the main converter (4, 11). Capacitor C3, diode D5, resistors R8 and R9 and a part H1 of integrated circuit IC constitute an oscillator which produces an asymmetrical square wave voltage. Part H1 functions generally as a NAND gate. This voltage is inverted by another part H2 of the IC and amplified by a pair of transistors T4 and T5 to provide a driving voltage for MOSFET type transistor T6. When transistor T6 is closed or conducting, the current from the primary source at terminal $U_i$ is shorted through inductor L2, in which the energy is accumulated. When transistor T6 opens, the current continues to flow through diode D6 and charges capacitor C4. This procedure is repeated until the voltage of capacitor C4 reaches the desired output voltage.

A feedback circuit comprising resistors R4, R5 and R6 produces a voltage to the base of transistor T3. The collector of transistor T3 is connected to IC part H1 and resistor R7. When the base voltage of transistor T3 exceeds about 0.6 volts, transistor T3 closes and draws one input of IC part H1 to a low voltage state, thus inhibiting the operation of the oscillator. When the output at terminal $U_o$ is connected to an external load the voltage of capacitor C4, and the base voltage of transistor T3 decrease slightly. Transistor T3 opens and enables the oscillator to operate to keep the output voltage constant. By adjusting the resistance of resistor R6, the base voltage at which transistor T3 closes, and thus the controlled output voltage, can be set to a desired level. If the output is not loaded, the converter circuit itself causes a small load. For instance, the stand by current at 12 V output is about 5 mA from a 1.5 V primary source, depending on the choice of the components.

In the circuit of FIG. 4, the IC circuit requires a minimum of approximately 3 volts at its input to operate and MOSFET transistor T6 requires a minimum of 4 volts and preferably 10 volts to operate. These potentials are initially obtained from auxiliary converter 2 over line 18 which line is connected to high voltage line 20 of control circuit 3. This signal is applied as the voltage input to the and is utilized as a high voltage source for amplifying transistors T4 and T5 which provide the input to MOSFET transistor T6. Auxiliary converter 2 thus provides the start voltage necessary to initiate the operation of control circuit 3 and of the MOSFET transistor based main converter 4. However, while the output on line 18 for the auxiliary converter is at a relatively high voltage, for example 10 volts, required to operate the other circuits, this circuit draws very little current, and its output is in the milliwatts power range.

Once capacitor C4 starts to charge, a feedback voltage is applied to the positive terminal of diode D4. When this potential exceeds the potential on line 18, diode D4 becomes forward biased, causing the output potential to appear on high voltage line 20. This voltage is applied through line 18 and zener diode D1 to cut off auxiliary stage 2. Thus, once the output voltage at terminal $U_o$ exceeds the output potential on line 18 from auxiliary converter 2, power for the circuit is obtained from the output of the main converter and the auxiliary converter is no longer utilized. As a result, in most applications, the auxiliary converter will only operate, and thus will only draw power from battery cell 1, during a short initial start-up period.

It should at this point be noted that, while different references have been used in FIGS. 1 and 4, coil 7 and coil L2, diode 8 and diode D6, and capacitor 9 and capacitor C4 are in fact the same elements. MOSFET switching transistor T6 performs the same function as the switch 5.

Figure 5:
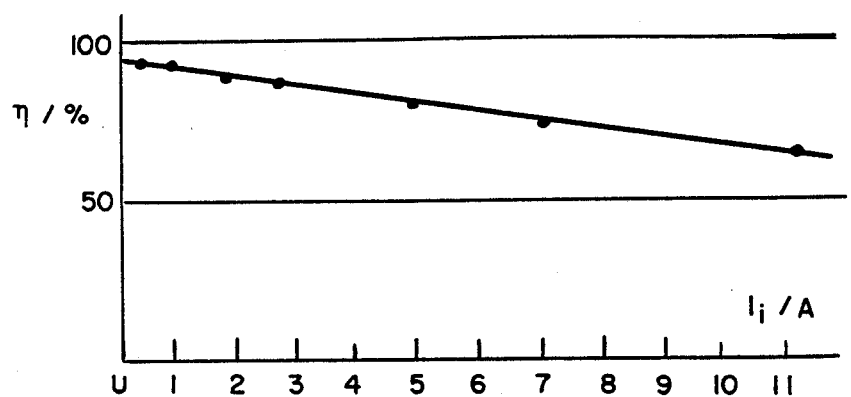
FIG. 5 is a diagram showing how the efficiency of the device depends on input amperage.

FIG. 5 is a diagram showing how the efficiency of the device built according to FIGS. 1, 3 and 4 depends on the input current. The losses are mainly resistive and proportional to the current. Therefore, the graph is quite linear. The input voltage does not substantially affect losses if the current remains the same. The efficiency was measured with various resistors and a NiCd storage battery as the power source. Between 0.5 and 10 A, corresponding to 0.6 to 12 W output, the efficiency was 95–72%. The efficiency can be further improved by lowering the resistance and hysteresis of inductor 7, the forward voltage of rectifier 8, the impedance of capacitor 9 and increasing the conductance of the switching component 5 by connecting several MOSFET transistors in parallel (see dotted MOSFET T6' in FIG. 4). The weight of the test device was 10 g/watt of output power.

Figure 6:
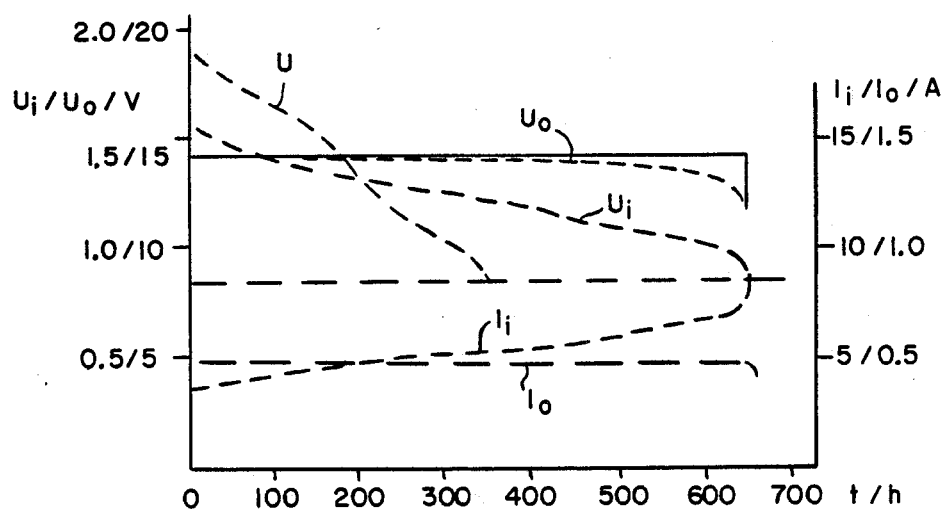
FIG. 6 is a diagram showing the performance of the combination of a large 1.5 V galvanic cell and the device according to the invention in a flashing buoy.

FIG. 6 is a typical diagram showing the discharge performance of a large, 2500 Wh, 1.5 V alkaline manganese cell, provided with the device according to the invention. Output voltage was adjusted to 14 V, and the load was a flashing navigational buoy with a 5 W bulb. During discharge the primary voltage $V_i$ decreased and correspondingly the primary current $I_i$ increased so that the output effect remained constant. Both the output voltage $V_o$ and the output current $I_o$ kept constant until the battery, because of increased internal resistance, could no more produce the adjusted voltage. The net energy received at 14 V was 2000 Wh or 80% of the theoretical energy of the battery. For comparison in the same diagram is plotted a discharge curve U of a multi-cell battery with same dimensions and electrochemistry. Initial voltage was 18 V, load was the same, and the output voltage was kept the same with a chopper unit. The time of effective performance was about 50% when compared to the 1-cell+converter system according to the invention.

Figure 7:
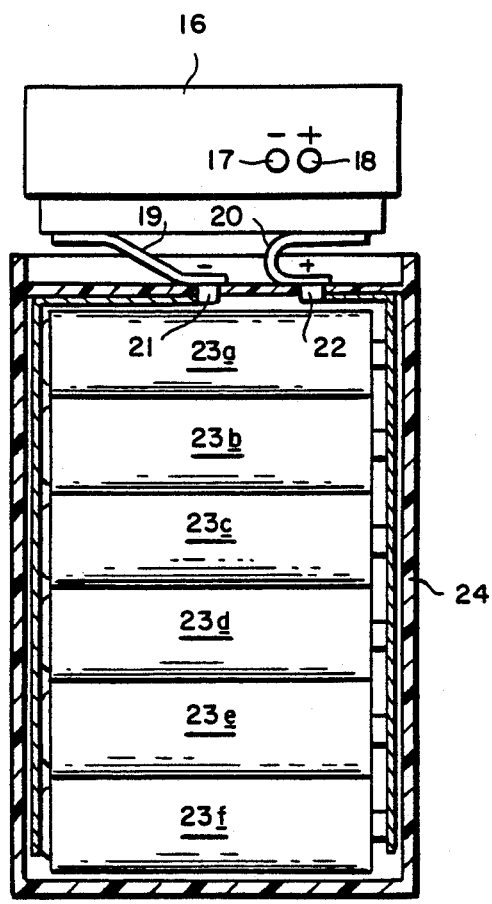
FIG. 7 shows schematically the use of the device with several battery cells connected in parallel.

FIG. 7 illustrates schematically a power source, which has an adjustable constant voltage. A device 16 according to the invention, having terminals 17 and 25, is fixed with low-resistance cables 19, 20 and rivets 21, 22 to a plastic box 24, inside of which at opposite sides are metal contact strips. The box 24 is loaded with battery cells 23a–23f which are connected in parallel by the contact strips. If the cells are taped together, re loading can be made very easy, like loading a firearm with cartridges. This arrangement can be used in applications including powerful emergency torches, video cameras and radio transceivers.

While the invention has been particularly shown and described above with reference to preferred embodiments, it is apparent that the invention could be implemented using components other than the specific components disclosed and that the the foregoing and other changes in form and detail may be made therein by one skilled in the art without departing from the spirit and scope of the invention.

What is claimed is:

1. A step-up DC to DC converter for use with a DC power source comprising:
   a main converter utilizing a low resistance switching element requiring a predetermined operating potential which is higher than the potential of said source, said main converter generating an output signal under control of said switching element at a predetermined voltage level higher than that of said source and at a predetermined power level;
   an auxiliary converter for generating an output at at least said predetermined operating potential and at a very low power level as compared to said predetermined power level;
   control means for selectively applying the output from said auxiliary converter to said switching element to control the state thereof; and
   means for feeding back the output voltage level from said main converter to said control means, said control means being operative in response to said feed back level for maintaining the output voltage at said predetermined voltage level.

2. A converter as claimed in claim 1 including means responsive to the output potential level from the main converter being greater than said auxiliary converter output potential for utilizing said output potential level to control the switching element and for deactivating said auxiliary converter.

3. A converter as claimed in claim 1 wherein said switching element is a MOSFET transistor.

4. A converter as claimed in claim 1 wherein said switching element includes a plurality of MOSFET transistors connected in parallel.

5. A converter as claimed in claim 1 wherein said main converter includes storage battery means, said battery means being charged when said source is fully operative and discharging to maintain the output level from said converter when said source is not adequately operative to maintain said predetermined output voltage level.

6. A converter as claimed in claim 1 including a plurality of main converters; and
   a control means for each of said main converters, the output from said auxiliary converter being applied by each of said control means to control the state of the corresponding main converter switching means.

7. A converter as claimed in claim 1 including means for adjusting the predetermined output level of said main converter.

8. A converter as claimed in claim 1 wherein said main converter has a capacitor, the output potential from the converter being the potential across the capacitor.

9. A converter as claimed in claim 8 wherein the switching element is connected to permit the charging of said capacitor from said source when the element is in one state and to inhibit charging when the element is in the other state.

10. A converter as claimed in claim 9 wherein said control circuit includes an oscillator, means for maintaining said switching element in said other state when there is no output from the oscillator, said means causing the switching element to switch to its one state when the oscillator output exceeds a selected level.

11. A converter as claimed in claim 10 wherein the output voltage fed back controls the output from said oscillator.

* * * * *